United States Patent
Bhave et al.

(10) Patent No.: US 12,528,053 B2
(45) Date of Patent: Jan. 20, 2026

(54) METHOD OF CONCENTRATING LITHIUM-CONTAINING SOLUTIONS AND RECOVERING LITHIUM THEREFROM

(71) Applicant: UT-Battelle, LLC, Oak Ridge, TN (US)

(72) Inventors: Ramesh R. Bhave, Oak Ridge, TN (US); Syed Z. Islam, Oak Ridge, TN (US); Priyesh A. Wagh, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 791 days.

(21) Appl. No.: 17/836,088

(22) Filed: Jun. 9, 2022

(65) Prior Publication Data
US 2022/0395780 A1 Dec. 15, 2022

Related U.S. Application Data

(60) Provisional application No. 63/208,624, filed on Jun. 9, 2021.

(51) Int. Cl.
*B01D 61/58* (2006.01)
*B01D 61/02* (2006.01)
(Continued)

(52) U.S. Cl.
CPC ........... *B01D 61/58* (2013.01); *B01D 61/025* (2013.01); *B01D 61/027* (2013.01);
(Continued)

(58) Field of Classification Search
CPC .... B01D 29/00; B01D 29/0095; B01D 29/01; B01D 29/05; B01D 29/50; B01D 29/52;
(Continued)

(56) References Cited

U.S. PATENT DOCUMENTS

2019/0024212 A1* 1/2019 Lien .................... B01D 61/029
2020/0140305 A1* 5/2020 Liberatore ............. C02F 1/442

OTHER PUBLICATIONS

PSM (Webpage dated Mar. 16, 2018; accessed Jul. 7, 2025) (Year: 2018).*

(Continued)

*Primary Examiner* — Allison G Fitzsimmons
(74) *Attorney, Agent, or Firm* — WARNER NORCROSS + JUDD LLP (57) ABSTRACT

A method of concentrating lithium containing solutions includes inputting a feed brine solution to an initial separation stage, the feed brine solution including lithium sulfate and one or more of sodium sulfate, potassium sulfate, calcium sulfate, and sodium chloride dissolved in water. In the initial separation stage, the feed brine solution is introduced to a pre-treatment membrane at a pressure that is less than the osmotic pressure of the feed brine solution. An initial permeate that passes through the pre-treatment membrane becomes the feed to a final separation stage, and an initial retentate that does not pass through the pre-treatment membrane includes a precipitate of at least one of the salts other than lithium sulfate. In the final separation stage, the initial permeate is introduced to a nanofiltration membrane at a pressure that is less than the osmotic pressure of the initial permeate. A final retentate that does not pass through the nanofiltration membrane is combined with the initial retentate to obtain a product solution having a higher concentration of dissolved lithium sulfate than the feed brine solution.

18 Claims, 3 Drawing Sheets

(51) Int. Cl.
*B01D 61/04* (2006.01)
*B01D 61/14* (2006.01)
*B01D 63/06* (2006.01)
*B01D 63/10* (2006.01)
*B01D 69/02* (2006.01)
*C01D 15/06* (2006.01)

(52) U.S. Cl.
CPC ....... *B01D 61/0271* (2022.08); *B01D 61/029* (2022.08); *B01D 61/04* (2013.01); *B01D 61/145* (2013.01); *B01D 63/06* (2013.01); *B01D 63/10* (2013.01); *B01D 69/02* (2013.01); *C01D 15/06* (2013.01); *B01D 2311/04* (2013.01); *B01D 2311/08* (2013.01); *B01D 2317/025* (2013.01); *B01D 2317/08* (2013.01); *B01D 2325/20* (2013.01)

(58) Field of Classification Search
CPC ........ B01D 29/56; B01D 29/58; B01D 29/88; B01D 29/90; B01D 29/906; B01D 36/00; B01D 36/003; B01D 36/02; B01D 36/008; B01D 37/00; B01D 37/04; B01D 37/03; B01D 61/00; B01D 61/002; B01D 61/0021; B01D 61/0022; B01D 61/14; B01D 61/145; B01D 61/146; B01D 61/147; B01D 61/149; B01D 61/16; B01D 61/18; B01D 61/58; B01D 63/00; B01D 63/08; B01D 69/00; B01D 69/02; B01D 69/04; B01D 69/06; B01D 2221/04; B01D 2221/14; B01D 2257/93; B01D 2257/00; B01D 2311/00; B01D 2311/02; B01D 2311/04; B01D 2311/06; B01D 2311/08; B01D 2311/252; B01D 2311/2521; B01D 2311/2523; B01D 2311/263; B01D 2311/2649; B01D 2317/00; B01D 2317/02; B01D 2317/04; B01D 2317/08; C02F 1/00; C02F 1/001; C02F 1/52; C02F 1/5209; C02F 1/5263; C02F 1/5281; C02F 1/58; C02F 1/68; C02F 1/683; C02F 9/00; C02F 2101/00; C02F 2101/10; C02F 2201/002; C02F 2301/00; C02F 2301/04; C02F 2301/08; C02F 2303/22; C22B 26/12; C22B 3/22; C22B 3/44; C22B 3/06; C22B 3/00; C22B 3/16; C22B 7/006; C22B 7/005; C01D 15/00; C01D 5/16; H01M 10/54; C25C 1/02

See application file for complete search history.

(56) References Cited

OTHER PUBLICATIONS

Synder (Webpage dated Jul. 2, 2019; accessed Jul. 7, 2025) (Year: 2019).*

Li et al. (Y. Li et al. / Desalination and Water Treatment 97 (2017) 141-150). (Year: 2017).*

* cited by examiner

METHOD OF CONCENTRATING LITHIUM-CONTAINING SOLUTIONS AND RECOVERING LITHIUM THEREFROM

CROSS-REFERENCE TO RELATED APPLICATIONS

This application claims the benefit of U.S. Provisional Application No. 63/208,624, filed Jun. 9, 2021, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to a method of concentrating lithium-containing solutions and recovering lithium from the lithium-containing solutions.

BACKGROUND OF THE INVENTION

Secondary mining process streams from non-traditional mining operations such as the mining of borates include lithium sulfate ($Li_2SO_4$) along with other sulfates such as sodium sulfate ($Na_2SO_4$), potassium sulfate ($K_2SO_4$), and calcium sulfate ($CaSO_4$), and may additional include salts such as sodium chloride (NaCl). Lithium has become a very important metal with the proliferation of modern electronics including personal electronic devices and electric vehicles, as lithium metal is a critical material for lithium-ion batteries used for energy storage to power a multitude of electronic devices, electric vehicles, and the like. Therefore, the recovery of lithium from secondary mining process streams that include lithium mixed together with other materials can provide a valuable resource that would otherwise be lost. Conventional processes for the concentration and separation of lithium sulfate-containing solutions include evaporation and/or crystallization. However, these conventional processes are complex, involve multiple steps, require significant amounts of energy, are costly, and result in a low, inefficient, and/or incomplete recovery of lithium. Hence, a need exists for an energy efficient process for concentrating lithium sulfates from solutions such as mining wastewater streams in order to effectively recover lithium from these sources.

SUMMARY OF THE INVENTION

A method of concentrating lithium containing solutions and recovering lithium therefrom is provided. The method is a multi-stage membrane-based process including a series of sequential membrane separation stages in which the first membrane of the series is a looser membrane (i.e., less selective or lower rejection to monovalent ions) than the subsequent membranes. The operating pressures in the process are also substantially lower than those used for conventional reverse osmosis/solution-diffusion processes that apply pressures greater than the osmotic pressure of the solution.

In some embodiments, the method includes inputting a feed brine solution to an initial separation stage, the feed brine solution including lithium sulfate and one or more of sodium sulfate, potassium sulfate, calcium sulfate, and sodium chloride dissolved in water. The initial separation stage of the method includes the step of introducing the feed brine solution to a pre-treatment membrane at a pressure that is less than the osmotic pressure of the feed brine solution to obtain an initial permeate that passes through the pre-treatment membrane and an initial retentate that does not pass through the pre-treatment membrane. A precipitate of at least one of the salts other than lithium sulfate is included in the initial retentate if the solubility limit is exceeded depending on composition and operating conditions such as pH and temperature. The method further includes directing the initial permeate to a final separation stage that has at least one separation step. One of the separation steps includes introducing the initial permeate to a nanofiltration membrane at a pressure that is less than the osmotic pressure of the initial permeate to obtain a final permeate that passes through the nanofiltration membrane and a final retentate that does not pass through the nanofiltration membrane, wherein a precipitate of at least one of the salts other than lithium sulfate is included in the final retentate. The method further includes combining the initial retentate and the final retentate to obtain a retentate mixture, and separating the precipitated salts from the retentate mixture to obtain a product solution having a higher concentration of dissolved lithium sulfate than the feed brine solution. The method is a cost-effective and energy-efficient process for concentrating lithium in lithium-containing solutions and obtaining lithium from these solutions for use in, by way of example, energy storage applications.

In specific embodiments, the final separation stage includes a first separation step and a second separation step. The first separation step includes introducing the initial permeate to a first nanofiltration membrane at a pressure that is less than the osmotic pressure of the initial permeate to obtain an intermediate permeate that passes through the first nanofiltration membrane and an intermediate retentate that does not pass through the first nanofiltration membrane, wherein a precipitate of at least one of the salts other than lithium sulfate is included in the intermediate retentate. The second separation step includes introducing the intermediate permeate to a second nanofiltration membrane at a pressure that is less than the osmotic pressure of the intermediate permeate to obtain the final permeate that passes through the second nanofiltration membrane and the final retentate that does not pass through the second nanofiltration membrane.

In particular embodiments, the step of combining the initial retentate and the final retentate to obtain a retentate mixture further includes combining the intermediate retentate with the initial retentate and the final retentate to obtain the retentate mixture.

In specific embodiments, the pre-treatment membrane in the initial separation stage may be one of an ultrafiltration membrane and a loose nanofiltration membrane. In particular embodiments, the pre-treatment membrane may be one of a tubular membrane and a wide feed channel spiral-wound membrane. In certain embodiments, the pre-treatment membrane may be a tight ultrafiltration membrane having a molecular weight cut-off (MWCO) in the range of 1000 to 1500 Da. In certain embodiments, the pre-treatment membrane may be an ultrafiltration membrane having a molecular weight cut-off (MWCO) in the range of 1500 to 4000 Da. In certain embodiments, the pre-treatment membrane may be a loose nanofiltration membrane having a molecular weight cut-off (MWCO) in the range of 100 to 1000 Da.

In specific embodiments, the nanofiltration membrane in the final separation stage may be one of a spiral-wound membrane and a tubular membrane. In particular embodiments, the nanofiltration membrane is a wide feed channel (i. d>1 mm) spiral-wound nanofiltration membrane. In specific embodiments, the nanofiltration membrane may have a molecular weight cut-off (MWCO) in the range of 100 to 450 Da.

In specific embodiments, the pH of the feed brine solution in the initial separation stage is in the range of 1.5 to 11.

In specific embodiments, the pH of the initial permeate in the final separation stage is in the range of 2 to 10.

In specific embodiments, the pH of one or more of the feed brine solutions and the initial permeate is adjusted by adding a mineral acid.

In specific embodiments, the precipitate in the initial retentate includes calcium sulfate salt.

In specific embodiments, the pressure in either or both of the initial separation stages, and the final separation stage is in the range of 10 to 50 bar.

In specific embodiments, lithium sulfate is present in the feed brine solution in an amount in the range of 1 to 2 wt. %, and in the product solution in an amount in the range of 8 to 10 wt. %.

In other embodiments, the final separation step may further include a reverse osmosis separation step after the second separation step, the reverse osmosis step including introducing the permeate from the second separation step to a reverse osmosis membrane to obtain a permeate that is substantially free of salt, and the retentate from the reverse osmosis step is further combined with the retentate mixture.

A system for concentration and recovery of lithium containing solutions is also provided. The system includes a feed of brine solution including lithium sulfate and one or more of sodium sulfate, potassium sulfate, calcium sulfate, and sodium chloride dissolved in water. The system further includes an initial separation stage including a pre-treatment membrane to which the brine solution is introduced via an input that receives the feed of brine solution at a pressure that is less than the osmotic pressure of the feed brine solution, an initial permeate outlet on the opposite side of the pre-treatment membrane relative to the feed, and an initial retentate outlet on the same side of the pre-treatment membrane as the feed. An initial permeate that passes through the pre-treatment membrane exits the initial separation stage through the initial permeate outlet, and an initial retentate that does not pass through the pre-treatment membrane exits the initial separation stage through the initial retentate outlet. A precipitate of at least one of the salts other than lithium sulfate is included in the initial retentate. The system further includes a final separation stage including a nanofiltration membrane to which the initial permeate is introduced via an input that receives the initial permeate from the initial separation stage at a pressure that is less than the osmotic pressure of the initial permeate, a final permeate outlet on the opposite side of the nanofiltration membrane relative to the input of initial permeate, and a final retentate outlet on the same side of the membrane as the input of initial permeate stream. A final permeate that passes through the nanofiltration membrane exits the final separation stage through the final permeate outlet, and a final retentate that does not pass through the nanofiltration membrane exits the final separation stage through the final retentate outlet. A precipitate of at least one of the salts other than lithium sulfate is included in the final retentate. The system further includes a filtration stage connected to the initial retentate outlet and the final retentate outlet. The filtration stage includes a filter that removes the precipitated salts from the initial retentate and the final retentate to obtain a product solution having a higher concentration of dissolved lithium sulfate than the feed brine solution.

In specific embodiments, the pre-treatment membrane in the initial separation stage is one of an ultrafiltration membrane and a loose nanofiltration membrane.

In specific embodiments, the nanofiltration membrane in the final separation stage is a tight nanofiltration membrane.

These and other features of the invention will be more fully understood and appreciated by reference to the description of the embodiments and the drawings.

DETAILED DESCRIPTION OF THE CURRENT EMBODIMENTS

Figure 1:
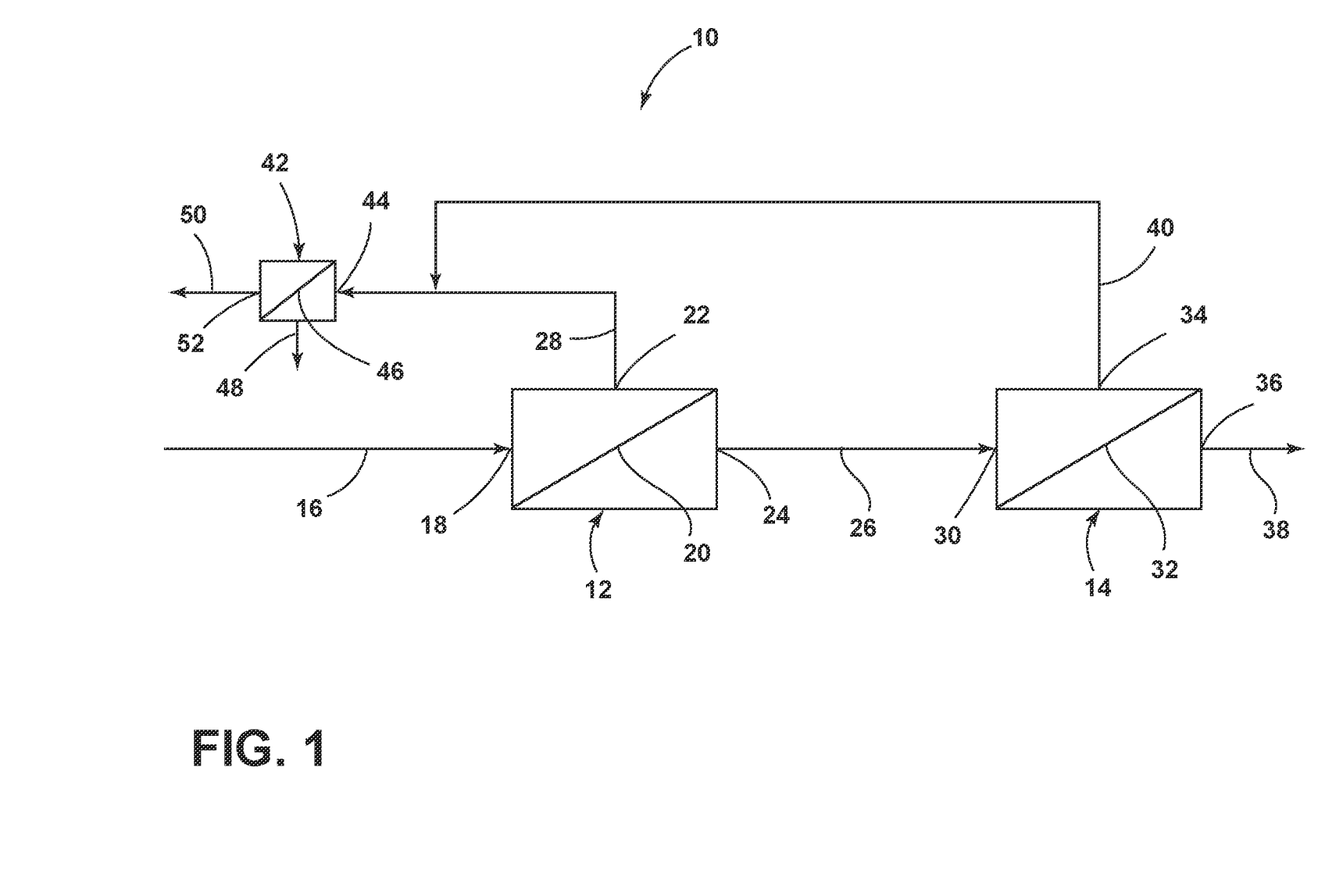
FIG. 1 is a schematic view of a system and method of concentrating lithium in lithium-containing solutions including two separation stages in accordance with specific embodiments of the invention.

As discussed herein, the current embodiments relate to a method of concentrating lithium in lithium-containing solutions, in order to recover lithium from the lithium-containing solutions. As generally illustrated in FIG. 1, the method embodied in a system 10 includes a series of sequential membrane separation steps in which certain salts present in the solution are precipitated out while the concentration of lithium dissolved in the solution is increased, the permeate from a previous step becomes the feed for a subsequent step, and the retentates are combined to obtain the final end product solution of concentrated lithium. The method utilizes nanofiltration membranes to achieve the separation of salts in the solution and the concentration of lithium. The concentrated lithium obtained from the method can be subsequently isolated for use in other applications such as the manufacturing of lithium-ion batteries.

More particularly, the method includes both an initial separation stage 12 and a final separation stage 14. The method first includes inputting a feed brine solution 16 to the initial separation stage 12. The feed brine solution may be, for example, a secondary mining process stream from a non-traditional mining operation such as the mining of borates. The feed brine solution includes lithium sulfate ($Li_2SO_4$) along with other sulfates such as sodium sulfate ($Na_2SO_4$), potassium sulfate ($K_2SO_4$), and calcium sulfate ($CaSO_4$) dissolved in water. The feed brine solution may also include chlorides such as sodium chloride (NaCl) and may additionally include sodium hydroxide (NaOH). The total salt content of the feed brine solution typically may be in the range of 20 to 25 wt. %, and more specifically may be approximately 21 to 22 wt. %, although salt content less than 20 wt. % or over 25 wt. % are within the scope of the disclosure. In general, the feed brine solution may include 1-2 wt. % $Li_2SO_4$, 3-5 wt. % $K_2SO_4$, 15-17 wt. % $Na_2SO_4$, 0.2-0.3 wt. % $CaSO_4$, and 10 wt. % NaCl. By way of non-limiting example, the feed brine solution may have the following (or similar) composition: 77.04 wt. % $H_2O$, 0.20 wt. % $CaSO_4$, 3.83 wt. % $K_2SO_4$, 1.44 wt. % $Li_2SO_4$, 16.01 wt. % $Na_2SO_4$, 0.86 wt. % NaOH, and 0.43 wt. % anhydrous borax. The pH of the feed brine solution may be anywhere in the range of 1.5 to 11, and may be adjusted using a mineral acid such as sulfuric acid or hydrochloric acid to lower the pH if, for example, it is above this range (e.g., 13), or if it is desired to lower the pH within this range (e.g., from 11 to 9). The compounds including the salts are dissolved in the solution and thus present in their ionic state. The ions include monovalent cations (lithium, sodium, potassium) and divalent cations (calcium) as well as monovalent anions (chlorides) and/or divalent anions (sulfates). While hydroxyl ions also may be contained in the solution, thus causing the pH of the solution to be basic, the relative concentration of sulfate ions is approximately two orders of magnitude higher than the hydroxyl ions and is the dominating species in the feed brine solution.

The initial separation stage 12 includes a feedstock input 18, a pre-treatment membrane 20, an initial retentate outlet 22 on the same side of the pre-treatment membrane 20 as the feedstock input 18, and an initial permeate outlet 24 on the opposite side of the pre-treatment membrane 20 relative to the feedstock input 18. The pre-treatment membrane 20 may be an ultrafiltration membrane or a loose nanofiltration membrane. A "loose" versus "tight" membrane indicates the size of the materials that are able to pass through the membrane. For example, a loose nanofiltration membrane may have a molecular weight cut off (MWCO) in the range of 600-1000 dalton (Da), whereas a tight nanofiltration membrane may have a MWCO in the range of 100 to 600 Da, preferably 100 to 450 Da. A loose ultrafiltration membrane may have a MWCO in the range of 1500-4000 Da, and a tight ultrafiltration membrane may have a MWCO in the range of 1000-1500 Da. The ultrafiltration membrane may be formed of polymers such as polysulfone or polyether ether ketone. The pre-treatment membrane 20 may also have a tubular geometry, a spiral geometry, or a hollow fiber geometry. In certain embodiments, the pre-treatment membrane 20 is a wide channel, spiral-wound nanofiltration membrane having a MWCO of up to approximately 600 to 800 Da. Wide channel and/or spiral wound membranes help to prevent against clogging and scaling of the membranes that could be caused by the precipitation of $CaSO_4$, $Na_2SO_4$, and $K_2SO_4$. In other words, the wide channel accommodates the precipitation of salts that may occur, so as to not plug the membrane. For example, in some embodiments the pre-treatment membrane 20 may be a spiral-wound membrane with a wide feed channel such as Hydracore 70 supplied by Hydranautics having a MWCO in the range of 600 to 800 Da and having a total salt rejection of approximately 32%, which may vary depending on the pH of the solution. The process includes the step of introducing the feed brine solution 16 to the pre-treatment membrane 20 via the feedstock input 18 at a pressure that is less than the osmotic pressure of the feed brine solution to obtain an initial permeate 26 that passes through the pre-treatment membrane 20 and an initial retentate 28 that does not pass through the pre-treatment membrane 20 and results in partial or incomplete recovery of the desired salts. The retentate is by definition the material(s) that do not pass through the membrane and is left behind, but it should be understood that in the context of the process disclosed herein, the retentate of each stage may include both desired materials as well as undesired materials, such that the retentate is not as a whole undesirable. Hence, as described in more detail below, the retentates of each stage are not disposed of, but are recycled and combined to obtain the desired final concentrated product solution. Moreover, each retentate includes both a desired salt, e.g. lithium sulfate, as well as undesired salts, such as calcium sulfate. The pressure applied to the feed brine solution 16 in the initial separation stage 12 is in the range of 10 to 50 bar, preferably in the range of 10 to 40 bar, more preferably in the range of 15 to 35 bar, even more preferably in the range of 20 to 30 bar. Having a sufficient amount of pressure is important to obtaining a desirable flux across the membrane, so the pressure may be set as high as possible without compromising the integrity of the membrane. In the initial separation stage 12, the required minimum pressure needed for reverse osmosis (solution-diffusion) is higher than the osmotic pressure of the feed brine solution 16, which may be at least 100 bar and may even exceed 300 bar. In other words, to use a reverse osmosis membrane, a pressure of more than 300 bar would be required to remove water from the feed brine solution to achieve the desired (or high) lithium concentration. These pressures are well outside of the upper limit of commercially available membranes. In order to avoid the high energy requirements to apply a pressure greater than 100 to 300 bar or more to the feed brine solution and the fact that conventional membranes are not rated to handle such high pressures, in the present method the pressure is run much lower than the pressure required for solution-diffusion through a reverse osmosis membrane. Using an ultrafiltration or loose nanofiltration membrane as the pre-treatment membrane 20 at a lower operating pressure in the range of 10 to 50 bar provides a 25-50% pre-treatment salt rejection with about 60-90% water recovery. Calcium sulfate precipitates first in the initial retentate 28 as it is very close to its solubility limit in the feed brine solution 16. Incidentally, the solubility limits of calcium sulfate, sodium sulfate, potassium sulfate, and lithium sulfate are approximately 0.25 wt. %, 21 wt. %, 11 wt. %, and 35 wt. %, respectively. As the concentration of calcium sulfate reaches its solubility limit in the initial separation stage 12 (as water crosses the pre-treatment membrane), it precipitates in the initial retentate 28 and is thereby removed from the solution. Also, nanofiltration membranes reject divalent cations (such as calcium) and divalent anions (such as sulfates), while generally allowing monovalent ions to pass. In the present invention in which the feed brine solution 16 contains both monovalent and divalent ions, monovalent ions are also rejected by the pre-treatment membrane 20 to maintain charge neutrality on the retentate side. Therefore, some amount of the lithium sulfate, sodium sulfate, and potassium sulfate are included in the initial retentate 28. Any of the sodium chloride that may be present in the feed brine solution 16 may also be rejected by the pre-treatment membrane 20. The precipitation of the calcium sulfate reduces the ionic strength and hence the osmotic pressure of the solution in the initial separation stage 12, thereby easing the permeation of water through the pre-treatment membrane. The initial permeate 26 that passes the pre-treatment membrane 20 may include amounts of the monovalent salts including lithium sulfate and additionally sodium sulfate and potassium sulfate if present in the feed brine solution.

The initial permeate 26 exits the initial separation stage 12 via the initial permeate outlet 24, and the initial retentate 28 exits the initial separation stage 12 via the initial retentate outlet 22. The initial permeate 26 becomes the feed for the next stage of the process. Particularly, the initial permeate 26 is fed to a final separation stage 14 that includes at least one separation step. Ideally, the final separation stage 14 only includes one separation step, but may include additional separation steps to further improve the final concentration of lithium sulfate. In some embodiments such as shown in FIG. 1, the final separation stage 14 includes an input 30 for the initial permeate 26, a nanofiltration membrane 32, a final retentate outlet 34 on the same side of the nanofiltration membrane 32 as the input 30 of the initial permeate 26, and a final permeate outlet 36 on the opposite side of the nanofiltration membrane 32 relative to the input 30. The nanofiltration membrane 32 may be a tight nanofiltration membrane having a MWCO in the range of approximately 100 to 600 Da, preferably in the range of 100 to 450 Da. The nanofiltration membrane 32 may have a tubular geometry, a spiral geometry, or a hollow fiber geometry. In certain embodiments, the nanofiltration membrane 32 may be a wide channel (such as >1 mm spacing), spiral-wound nanofiltration membrane having a MWCO in the range of 100 to 450 Da. In some embodiments, the nanofiltration membrane may be a thin-film composite polyamide nanofiltration membrane. For example, the nanofiltration membrane 32 may be, but is not limited to, a spiral-wound membrane with a wide feed channel such as the commercially available Nano-SWJ from Hydranautics having a MWCO in the range of 100 to 450 Da that can provide a divalent salt rejection in the range of 70 to 95% and a total salt rejection of approximately 54 wt. %, which may vary depending on the pH of the solution. The process includes the step of introducing the initial permeate 26 to the nanofiltration membrane 32 via the input 30 at an applied pressure that is less than the osmotic pressure of the initial permeate 26 to obtain a final permeate 38 that passes through the nanofiltration membrane 32 and a final retentate 40 that does not pass through the nanofiltration membrane 32. The pressure applied to the initial permeate 26 in the final separation stage 14 is the range of 10 to 50 bar, preferably in the range of 10 to 40 bar, more preferably in the range of 15 to 35 bar, even more preferably in the range of 20 to 30 bar. Approximately 70 to 95% of the divalent salt is rejected by the nanofiltration membrane 32, hence a majority of the lithium sulfate and other salts are present in the final retentate 40. A precipitate of at least one of the salts other than lithium sulfate is included in the final retentate 40, for example sodium sulfate, while the balance of the salts present in the final retentate 40 remain in solution. The final permeate 38 includes water and relatively small amounts of lithium sulfate and additionally sodium sulfate, potassium sulfate, and/or sodium chloride if present in the feed brine solution and hence the initial permeate.

The final permeate 38 exits the final separation stage 14 via the final permeate outlet 36, and the final retentate 40 exits the final separation stage 14 via the final retentate outlet 34. The final retentate 40 as well as the initial retentate 28 from the initial separation stage 12 are both fed to a filtration stage 42 that is connected to the initial retentate outlet 22 and the final retentate outlet 34. The filtration stage 42 includes and input 44 and a filter 46 that removes the precipitated salts from the initial retentate 28 and the final retentate 40. More specifically, the process includes the step of combining the initial retentate 28 and the final retentate 40 to obtain a retentate mixture in the filtration stage 42, and the retentate mixture is passed through the filter 46 to separate and remove the precipitated salts 48 (including calcium sulfate and/or sodium sulfate) to obtain a product solution 50 via an outlet 52 of the filtration stage 42. The filter 46 may be, for example, a wide feed channel spiral-wound membrane or a tubular membrane. However, it should be understood that the precipitated salts 48 may be removed from the retentate mixture by other suitable separation methods. The product solution 50 has a higher concentration of dissolved lithium sulfate than the feed brine solution 16. For example, the feed brine solution 16 may have a concentration of lithium sulfate in the range of 1 to 2 wt. % while the product solution 50 may have a concentration of lithium sulfate in the range of 8 to 10 wt. %. Additionally, the product solution 50 may include approximately 11 wt. % potassium sulfate (e.g. 9 to 13 wt. % potassium sulfate) and/or approximately 23 wt. % sodium sulfate (e.g. 21 to 25 wt. % sodium sulfate).

Figure 2:
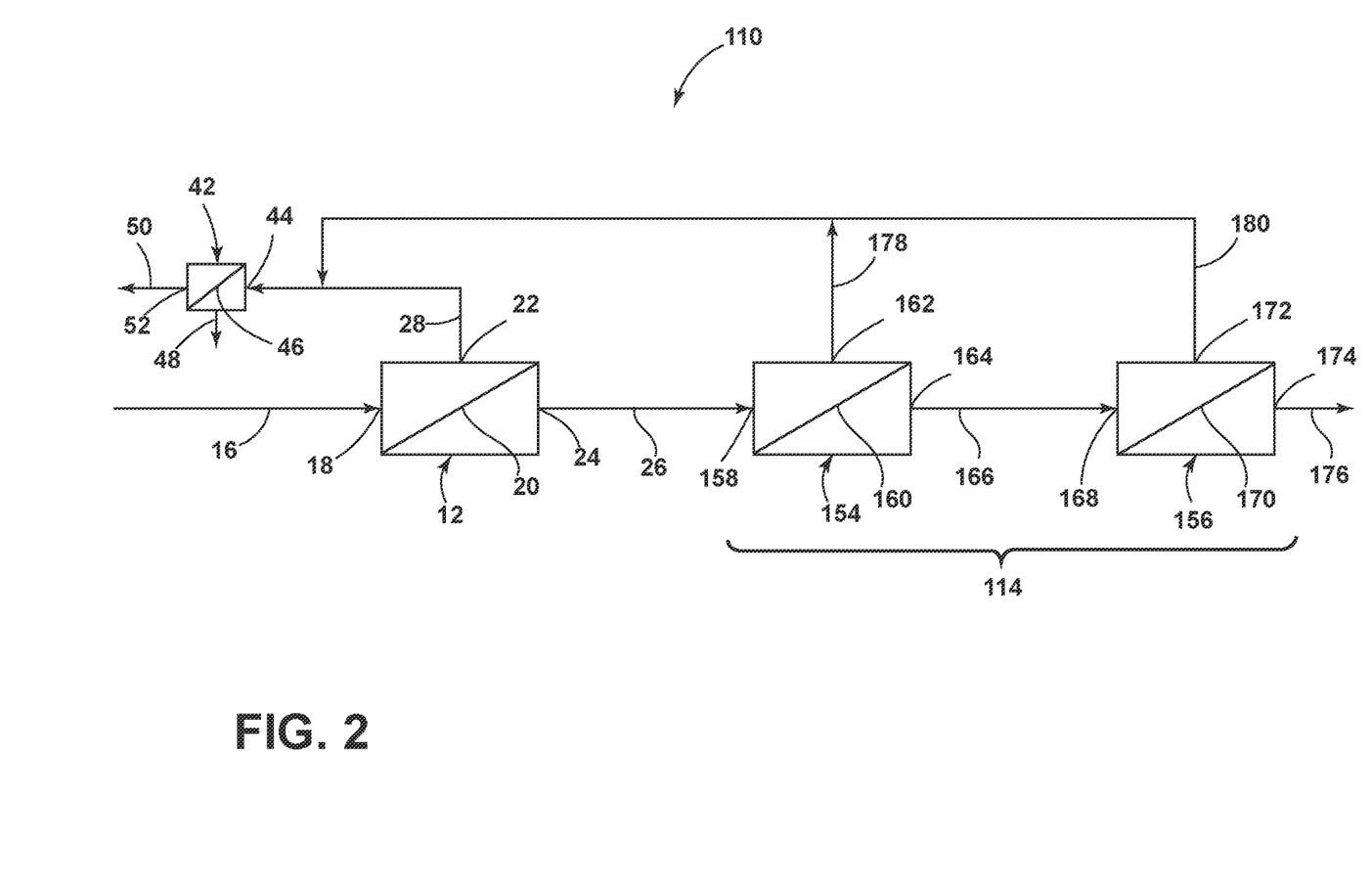
FIG. 2 is a schematic view of a system and method of concentrating lithium in lithium-containing solutions including three separation stages in accordance with other embodiments of the invention.

In other embodiments of the system 110 such as shown in FIG. 2, the final separation stage 114 includes more than one separation step, for example a first and second separation step, while it is understood that the final separation stage could include even more than two separation steps, in which each of the separation steps may be duplicates of or similar to each other, and the permeate of an upstream separation step becomes the feed for the adjacent downstream step. Further separation steps may provide further concentration and separation of salts remaining in the permeate. Other than the final separation stage 114 including multiple sub-stages, the system 110 is the same as the system 10, and like reference numerals indicate like elements. As shown by example, the final separation stage 114 may have a first separation sub-stage 154 (in which the first separation step is performed) and a second separation sub-stage 156 (in which the second separation step is performed). The first separation sub-stage 154 includes a first input 158 for the initial permeate 26, a first nanofiltration membrane 160, an intermediate retentate outlet 162 on the same side of the first nanofiltration membrane 160 as the first input 158 of the initial permeate 26, and an intermediate permeate outlet 164 on the opposite side of the first nanofiltration membrane 160 relative to the first input 158. The intermediate permeate 166 exiting the first separation sub-stage 154 through the intermediate permeate outlet 164 becomes the feed for the second separation sub-stage 156. The second separation sub-stage 156 includes a second input 168 for the intermediate permeate 166, a second nanofiltration membrane 170, a final retentate outlet 172 on the same side of the second nanofiltration membrane 170 as the second input 168 of the intermediate permeate 166, and a final permeate outlet 174 on the opposite side of the second nanofiltration membrane 170 relative to the second input 168. The first and second nanofiltration membranes 160, 170 may have the same or similar properties as the nanofiltration membrane 32, and the nanofiltration membranes 160, 170 may be the identical to each other or may be two different types of nanofiltration membranes.

The final permeate 176 exits the final separation stage 114 via the final permeate outlet 174, and the final permeate subsequently may be removed from the process and/or added used as a supply of fresh water. The intermediate retentate 178 and the final retentate 180 exit the final separation stage 114 via the intermediate retentate outlet 162 and final retentate outlet 172, respectively. The intermediate retentate 178 and the final retentate 180 from the final separation stage 114 as well as the initial retentate 28 from the initial separation stage 12 are all combined and fed to the filtration stage 42 that is connected to the initial retentate outlet 22, the intermediate retentate outlet 162, and the final retentate outlet 172. The initial retentate 28, intermediate retentate 178, and final retentate 180 are combined as they are fed to the filtration stage 42 to obtain a retentate mixture, and the precipitated salts in the combined retentate mixture are removed in the filtration stage as described above to obtain the product solution 50 having a higher concentration of dissolved lithium sulfate. It should be therefore understood that all of the retentate and permeate streams are "recycled" and remain within the system (without losing these streams), with the only outputs of the system being the final permeate (which is primarily water, or essentially clean water as described below), the product solution 50 which is a concentrated aqueous solution of lithium sulfate, and the precipitated solid salts, which may include calcium sulfate and potassium sulfate.

Figure 3:
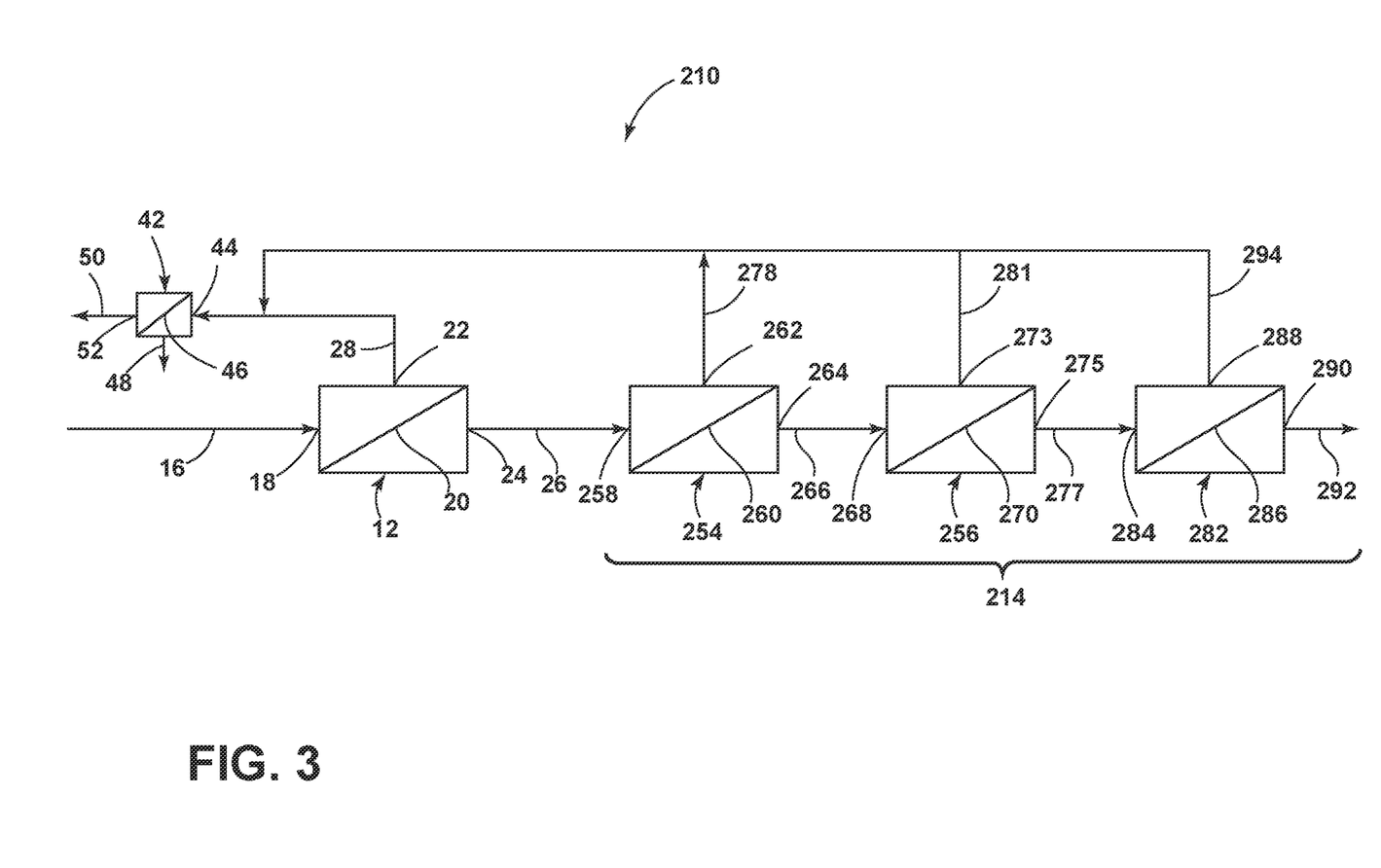
FIG. 3 is a schematic view of a system and method of concentrating lithium in lithium-containing solutions including three separation stages followed by a reverse osmosis stage in accordance with other embodiments of the invention.

In yet other embodiments of the system 210 such as shown in FIG. 3, the final separation stage 214 includes three separation steps in which the last separation step is a reverse osmosis step. Other than the final separation stage 214 concluding with a reverse osmosis sub-stage, the system 210 is the same as the system 110, and like reference numerals indicate like elements. As shown by example, the final separation stage 214 may have a first separation sub-stage 254 and a second separation sub-stage 256. The first separation sub-stage 254 includes a first input 258 for the initial permeate 26, a first nanofiltration membrane 260, a first intermediate retentate outlet 262 on the same side of the first nanofiltration membrane 260 as the first input 258 of the initial permeate 26, and a first intermediate permeate outlet 264 on the opposite side of the first nanofiltration membrane 260 relative to the first input 258. The first intermediate permeate 266 exiting the first separation sub-stage 254 through the intermediate permeate outlet 264 becomes the feed for the second separation sub-stage 256. The second separation sub-stage 256 includes a second input 268 for the first intermediate permeate 266, a second nanofiltration membrane 270, a second intermediate retentate outlet 273 on the same side of the second nanofiltration membrane 270 as the second input 268 of the first intermediate permeate 266, and a second intermediate permeate outlet 275 on the opposite side of the second nanofiltration membrane 270 relative to the second input 268. The second intermediate permeate 277 exiting the second separation sub-stage 256 through the second intermediate permeate outlet 275 becomes the feed for a subsequent and final reverse osmosis sub-stage 282. The reverse osmosis sub-stage 282 includes a third input 284 for the second intermediate permeate 277, a reverse osmosis membrane 286, a final retentate outlet 288 on the same side of the reverse osmosis membrane 286 as the third input 284 of the second intermediate permeate 277, and a final permeate outlet 290 on the opposite side of the reverse osmosis membrane 286 relative to the third input 284. The reverse osmosis membrane 286 may, for example, have a MWCO of 100 or less. In these embodiments, the concentration of dissolved salts in the second intermediate permeate 277 that enters the reverse osmosis sub-stage 282 is generally in the range of 2 to 3 wt. %, which is well within the range of capabilities of a reverse osmosis membrane separation. A pressure greater than the osmotic pressure of the second intermediate permeate 277 is applied in the reverse osmosis sub-stage 282, for example a pressure that is greater than 40 bar. The salts in the second intermediate permeate 277 are nearly completely (i.e., greater than 90%, more preferably greater than 95%, even more preferably greater than 99%) separated from water, such that the final permeate 292 that passes through the reverse osmosis membrane 286 is nearly completely free of salt (i.e., it is "fresh" water), with the salt being retained in the final retentate 294. The system 210 therefore may include a series of membrane separation stages in order of an ultrafiltration or loose nanofiltration membrane 20, a loose or tight nanofiltration membrane 260, a tight nanofiltration membrane 270, and lastly a reverse osmosis membrane 286.

The final permeate 292 exits the reverse osmosis stage 282 via the final permeate outlet 290. The first intermediate retentate 278, the second intermediate retentate 281, and the final retentate 294 exit the final separation stage 214 via the first intermediate retentate outlet 262, the second intermediate retentate outlet 273, and the final retentate outlet 288, respectively. The first intermediate retentate 278, the second intermediate retentate 281, and the final retentate 294 from the final separation stage 214 as well as the initial retentate 28 from the initial separation stage 12 are all combined and fed to the filtration stage 42 that is connected to the initial retentate outlet 22, the first intermediate retentate outlet 262, the second intermediate retentate outlet 273, and the final retentate outlet 288. The initial retentate 28, the first intermediate retentate 278, the second intermediate retentate 281, and the final retentate 294 are combined as they are fed to the filtration stage 42 to obtain a retentate mixture, and the precipitated salts in the combined retentate mixture are removed in the filtration stage as described above to obtain the product solution 50 having a higher concentration of dissolved lithium sulfate. The final permeate 292 is essentially free of any salt or other contaminants, and may be used as potable water or otherwise added to a fresh water supply.

The concentrated, recovered lithium present in the product solution 50 exiting the process via the outlet 52 of the filtration stage 42 can be isolated and used for various applications in industries such as the battery industry, the glass industry, the pharmaceutical industry, and the like. Additionally, potassium recovered in the process and present in the product solution 50 may be used for practical applications such as in fertilizers.

The present method is further described in connection with the following laboratory examples, which are intended to be non-limiting.

Example 1

For a two-stage separation process, 6 liters of a simulated feed brine solution having a salt content of 21.5 wt. % was prepared and the pH of the solution was adjusted to 9 using NaOH. A Hydracore 70 membrane was used as the pretreatment membrane in the initial separation stage, and a Nano-SWJ membrane was used as the nanofiltration membrane in the final separation stage. The membrane area was 0.28 m$^2$. The initial separation stage provided a total salt rejection of 37% and a flux of 14 LMH for the feed brine solution at a pH of 9 and an operating pressure of 20 bar. After the initial separation stage, calcium sulfate was precipitated with approximately 90% water recovery, as calcium sulfate is very close to its solubility limit in the feed brine solution. Precipitation of calcium sulfate reduced the ionic strength and hence the osmotic pressure of the feed brine solution. The permeate of the initial separation stage was then used as a feed solution for nanofiltration membrane in the final separation stage at an operating pressure of 30 bar. The permeate fed to the final separation stage had a total salt content of 14 wt. %. The final separation stage provided a salt rejection of 68%, a flux of 8.4 LMH, and about 60% water recovery for this stage. The following table shows feed, permeate, and retentate concentrations obtained. All of the retentate streams are combined together to obtain the desired recovery and purity of lithium. In other words, all of the streams, except the final permeate, are recycled in the system to achieve a high recovery of the materials in the feed stream.

TABLE 1

Two separation step process

| Stream | Li$_2$SO$_4$ (g/L) | Na$_2$SO$_4$ (g/L) | K$_2$SO$_4$ (g/L) | CaSO$_4$ (g/L) |
| --- | --- | --- | --- | --- |
| Input Feed | 15 | 160 | 38.3 | 2 |
| Initial Retentate | 24.9 | 229.2 | 63.8 | 2.2 |
| Initial Permeate | 10.5 | 112 | 27 | 0 |
| Final Retentate | 26.4 | 223.6 | 70.2 | 0 |
| Final Permeate | 3.5 | 36 | 9 | 0 |

Example 2

For a three-stage separation process (an initial separation stage and two final separation sub-stages), 10 L of a simulated feed brine solution having a salt content of 21.5 wt. % was prepared and the pH of the solution was adjusted to 9 using NaOH. A Hydracore 70 membrane was used as the pre-treatment membrane in the initial separation stage, and the pre-treatment membrane provided a salt rejection of between 32 and 36% and a flux of between 11 and 13 LMH for the feed brine solution at a pH of 9 and an operating pressure of 20 bar. The membrane area was 0.28 m$^2$. After the initial separation stage, calcium sulfate was precipitated with around 80% water recovery. The permeate of the initial separation stage was fed to the final separation stage. Nano-SWJ membranes were used as the nanofiltration membranes for the two separation sub-steps of the final separation stage. The membrane area was 0.28 m$^2$. The total salt concentration of the initial permeate fed to the first nanofiltration membrane was 14 wt. %, and the first sub-step provided a salt rejection of between 66 and 68% and a flux of between 7 and 7.5 LMH at a pH of 9 and an operating pressure of 30 bar. After the second stage, calcium sulfate and sodium sulfate were precipitated with a 75% recovery (cumulative 60% recovery), as the concentrations of the two salts in the intermediate retentate crossed solubility limits in the solution. Lithium sulfate was concentrated from 1.5 wt. % to 2.8 wt. % after the first sub-step. The intermediate permeate obtained in the first sub-step was then fed to the second nanofiltration membrane of the second sub-step. The total salt concentration of the intermediate permeate fed to the second nanofiltration membrane was 5.02 wt. %, and the second sub-step provided a salt rejection of 98.6% and a flux of 11.2 LMH at a pH of 9 and an operating pressure of 30 bar. Calcium sulfate and sodium sulfate were precipitated with a water recovery of around 66% (cumulative 40% recovery). The following table shows feed, permeate, and retentate concentrations obtained.

TABLE 2

Three separation step process

| Stream | Flow rate (L/h) | Li$_2$SO$_4$ (g/L) | Na$_2$SO$_4$ (g/L) | K$_2$SO$_4$ (g/L) | CaSO$_4$ (g/L) |
| --- | --- | --- | --- | --- | --- |
| Input Feed | 10 | 15 | 160 | 38.3 | 2 |
| Initial Retentate | 2 | 35 | 228 | 86.5 | 2.4 |
| Initial Permeate | 8 | 10 | 118 | 26 | 0 |
| Intermediate Retentate | 2 | 28 | 225.6 | 83 | 0 |
| Intermediate Permeate | 6 | 4 | 39 | 7 | 0 |
| Final Retentate | 2 | 11.2 | 230 | 20.7 | 0 |
| Final Permeate | 4 | 0.4 | 0.07 | 0.17 | 0 |

Example 3

In another two-stage separation process in which the feed brine solution additionally included sodium chloride, 10 L of a simulated feed brine solution having a sulfate content of 21.5 wt. % and a sodium chloride content of 10 wt. % was prepared with a pH of 9. A Hydracore 70 membrane was used as the pre-treatment membrane in the initial separation stage, and a Nano-SWJ membrane was used as the nanofiltration membrane in the final separation stage. The membrane area was 0.28 m$^2$. The initial separation stage provided a total salt rejection of 27% and a flux of 9.64 LMH with around 80% water recovery and a permeate volume of 1350 mL. The permeate of the initial separation stage was then used as a feed solution for nanofiltration membrane in the final separation stage. The final separation stage provided a salt rejection of 52%, a flux of 6.14 LMH, with around 75% water recovery and a permeate volume of 860 mL. The following table shows feed, permeate, and retentate concentrations obtained.

TABLE 3

Two separation step process with feed including NaCl

| Stream | Flow rate (L/h) | Li$_2$SO$_4$ (g/L) | Na$_2$SO$_4$ (g/L) | K$_2$SO$_4$ (g/L) | CaSO$_4$ (g/L) | NaCl (g/L) |
| --- | --- | --- | --- | --- | --- | --- |
| Input Feed | 10 | 15 | 160 | 38.3 | 2 | 100 |
| Initial Retentate | 2 | 28 | 223 | 78.3 | 2 | 198 |
| Initial Permeate | 8 | 11.2 | 123.6 | 29.8 | 0 | 58 |
| Final Retentate | 2 | 24.4 | 216 | 38.3 | 0 | 176 |
| Final Permeate | 6 | 4.7 | 53 | 13 | 0 | 34 |

Example 4

In another three-stage separation process (an initial separation stage and two final separation sub-stages) in which the feed brine solution additionally included sodium chloride, 20 L of a simulated feed brine solution having a sulfate content of 21.5 wt. % and a sodium chloride content of 10 wt. % was prepared with a pH of 9. A Hydracore 70 membrane was used as the pre-treatment membrane in the initial separation stage, and Nano-SWJ membranes were used as the nanofiltration membrane in the two steps of the final separation stage. The membrane area was 0.28 m$^2$. The initial separation stage provided a total salt rejection of 26% and a flux of 9.64 LMH at an operating pressure of 20 bar with around 90% water recovery and a permeate volume of 1350 mL. The permeate of the initial separation stage was fed to the first nanofiltration membrane in the final separation stage. The first separation sub-step of the final separation stage provided a total salt rejection of 54% and a flux of 6.14 LMH at an operating pressure of 30 bar with around 83% water recovery and a permeate volume of 860 mL. The intermediate permeate obtained in the first separation sub-step was then fed to the second nanofiltration membrane of the second separation sub-step. The second separation sub-step of the final separation stage provided a total salt rejection of 82% and a flux of 8.07 LMH at an operating pressure of 30 bar with around 80% water recovery and a permeate volume of 1130 mL. The following table shows feed, permeate, and retentate concentrations obtained.

TABLE 4

Three separation step process with feed including NaCl

| Stream | Flow rate (L/h) | $Li_2SO_4$ (g/L) | $Na_2SO_4$ (g/L) | $K_2SO_4$ (g/L) | $CaSO_4$ (g/L) | NaCl (g/L) |
|---|---|---|---|---|---|---|
| Input Feed | 20 | 15 | 160 | 38.3 | 2 | 100 |
| Initial Retentate | 3 | 38 | 224 | 122.3 | 2 | 203 |
| Initial Permeate | 18 | 11.5 | 125 | 30.1 | 0 | 61 |
| Intermediate Retentate | 3 | 24 | 226 | 117.4 | 0 | 187 |
| Intermediate Permeate | 15 | 3.3 | 58 | 12.4 | 0 | 34 |
| Final Retentate | 3 | 15.6 | 221 | 103.2 | 0 | 156 |
| Final Permeate | 12 | 1.2 | 14 | 2.4 | 0 | 7 |

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of concentrating lithium containing solutions, the method comprising:
   inputting a feed brine solution to an initial separation stage, the feed brine solution including lithium sulfate and one or more of sodium sulfate, potassium sulfate, calcium sulfate, and sodium chloride dissolved in water, the feed brine solution having a total salt content in a range of 20 to 31.5 wt. %, and the feed brine solution having a content of lithium sulfate in a range of 1 to 2 wt. %;
   the initial separation stage including the step of introducing the feed brine solution to a pre-treatment membrane at a pressure that is less than the osmotic pressure of the feed brine solution to obtain an initial permeate that passes through the pre-treatment membrane and an initial retentate that does not pass through the pre-treatment membrane, wherein the initial retentate includes lithium sulfate and a precipitate of at least one of the salts other than lithium sulfate;
   directing the initial permeate to a final separation stage including at least one separation step, the at least one separation step including introducing the initial permeate to at least one nanofiltration membrane at a pressure that is less than the osmotic pressure of the initial permeate to obtain a final permeate that passes through the at least one nanofiltration membrane and a final retentate that does not pass through the at least one nanofiltration membrane, wherein the final retentate includes lithium sulfate and a precipitate of at least one of the salts other than lithium sulfate;
   combining the initial retentate and the final retentate to obtain a retentate mixture; and
   separating the precipitated salts from the retentate mixture to obtain a product solution having a higher concentration of dissolved lithium sulfate than the feed brine solution, the product solution being obtained solely from the retentates of the initial and final separation stages, and the product solution having a content of lithium sulfate in a range of 8 to 10 wt. %.

2. The method of claim 1, wherein the at least one separation step of the final separation stage includes a first separation step and a second separation step;
   the first separation step including introducing the initial permeate to a first nanofiltration membrane of the at least one nanofiltration membrane at a pressure that is less than the osmotic pressure of the initial permeate to obtain an intermediate permeate that passes through the first nanofiltration membrane and an intermediate retentate that does not pass through the first nanofiltration membrane, wherein a precipitate of at least one of the salts other than lithium sulfate is included in the intermediate retentate; and
   the second separation step including introducing the intermediate permeate to a second nanofiltration membrane of the at least one nanofiltration membrane at a pressure that is less than the osmotic pressure of the intermediate permeate to obtain the final permeate and the final retentate.

3. The method of claim 2, wherein the step of combining the initial retentate and the final retentate to obtain a retentate mixture further includes combining the intermediate retentate with the initial retentate and the final retentate to obtain the retentate mixture.

4. The method of claim 1, wherein the pre-treatment membrane in the initial separation stage is one of an ultrafiltration membrane and a loose nanofiltration membrane, wherein the loose nanofiltration membrane is a nanofiltration membrane that has a molecular weight cut-off (MWCO) in the range 100 to 1000 Da.

5. The method of claim 4, wherein the pre-treatment membrane is one of a tubular membrane and a spiral-wound membrane.

6. The method of claim 4, wherein the pre-treatment membrane is a tight ultrafiltration membrane having a molecular weight cut-off (MWCO) in the range of 1000 to 1500 Da.

7. The method of claim 4, wherein the pre-treatment membrane is an ultrafiltration membrane having a molecular weight cut-off (MWCO) in the range of 1500 to 4000 Da.

8. The method of claim 1, wherein the nanofiltration membrane in the final separation stage is one of a spiral-wound membrane and a tubular membrane.

9. The method of claim 8, wherein the nanofiltration membrane is a spiral-wound nanofiltration membrane.

10. The method of claim 8, wherein the nanofiltration membrane has a molecular weight cut-off (MWCO) in the range of 100 to 450 Da.

11. The method of claim 1, wherein the pH of the feed brine solution in the initial separation stage is in the range of 1.5 to 11.

12. The method of claim 1, wherein the pH of one or more of the feed brine solution and the initial permeate is adjusted by adding a mineral acid.

13. The method of claim 1, wherein the precipitate in the initial retentate includes calcium sulfate salt.

14. The method of claim 1, wherein the pressure in the initial separation stage and the final separation stage is in the range of 10 to 50 bar.

15. The method of claim 2, wherein the final separation step further includes a reverse osmosis separation step after the second separation step, the reverse osmosis step including introducing the permeate from the second separation step to a reverse osmosis membrane to obtain a permeate that is substantially free of salt, and the retentate from the reverse osmosis step is further combined with the retentate mixture.

16. A system for concentration and recovery of lithium containing solutions, the system comprising:
  a feed of brine solution including lithium sulfate and one or more aqueous solutions of sodium sulfate, potassium sulfate, calcium sulfate, and sodium chloride, the feed brine solution having a total salt content in the range of 20 to 31.5 wt. %, and the feed brine solution having a content of lithium sulfate in a range of 1 to 2 wt. %;
  an initial separation stage including a pre-treatment membrane to which the brine solution is introduced via an input that receives the feed of brine solution at a pressure that is less than the osmotic pressure of the feed brine solution, an initial permeate outlet on the opposite side of the pre-treatment membrane relative to the feed, and an initial retentate outlet on the same side of the pre-treatment membrane as the feed, wherein an initial permeate that passes through the pre-treatment membrane exits the initial separation stage through the initial permeate outlet, and an initial retentate that does not pass through the pre-treatment membrane exits the initial separation stage through the initial retentate outlet, and the initial retentate includes lithium sulfate and a precipitate of at least one of the salts other than lithium sulfate;
  a final separation stage including a nanofiltration membrane to which the initial permeate is introduced via an input that receives the initial permeate from the initial separation stage at a pressure that is less than the osmotic pressure of the initial permeate, a final permeate outlet on the opposite side of the nanofiltration membrane relative to the input of initial permeate, and a final retentate outlet on the same side of the membrane as the input of initial permeate, wherein a final permeate that passes through the nanofiltration membrane exits the final separation stage through the final permeate outlet, and a final retentate that does not pass through the nanofiltration membrane exits the final separation stage through the final retentate outlet, and the final retentate includes lithium sulfate and a precipitate of at least one of the salts other than lithium sulfate; and
  a filtration stage connected to the initial retentate outlet and the final retentate outlet, the filtration stage including a filter that removes the precipitated salts from the initial retentate and the final retentate to obtain a product solution having a higher concentration of dissolved lithium sulfate than the feed brine solution, the product solution being obtained solely from the retentates of the initial and final separation stages, and the product solution having a content of lithium sulfate in a range of 8 to 10 wt. %.

17. The system of claim 16, wherein the pre-treatment membrane in the initial separation stage is one of an ultrafiltration membrane and a loose nanofiltration membrane.

18. The system of claim 16, wherein the nanofiltration membrane in the final separation stage is a tight nanofiltration membrane.

* * * * *